Sept. 22, 1970     R. W. DIXON ET AL     3,529,886
IODIC ACID ACOUSTO-OPTIC DEVICES
Filed July 31, 1968     2 Sheets-Sheet 1
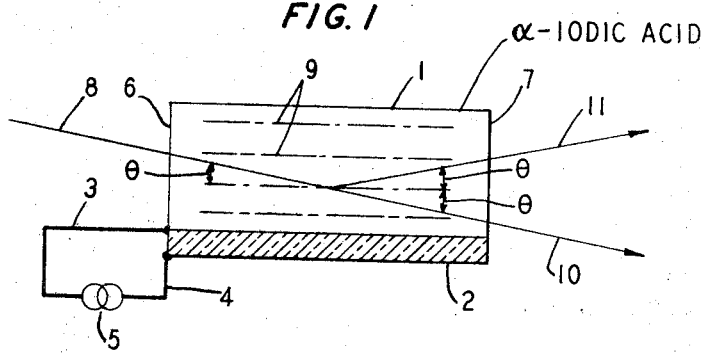
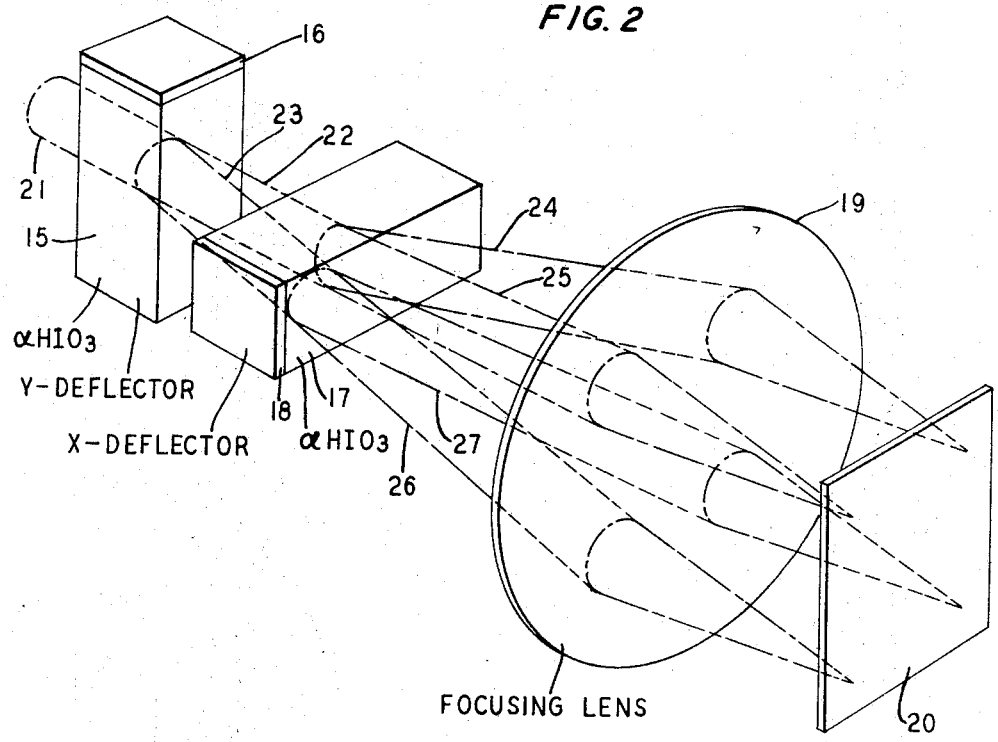
INVENTORS R. W. DIXON
D. A. PINNOW
BY
George S. Indig
ATTORNEY Sept. 22, 1970  R. W. DIXON ET AL  3,529,886
IODIC ACID ACOUSTO-OPTIC DEVICES Filed July 31, 1968  2 Sheets-Sheet 2

United States Patent Office 3,529,886
Patented Sept. 22, 1970

3,529,886
IODIC ACID ACOUSTO-OPTIC DEVICES
Richard W. Dixon, Morristown, and Douglas A. Pinnow, Berkeley Heights, N.J., assignors to Bell Telephone Laboratories, Incorporated, Murray Hill and Berkeley Heights, N.J., a corporation of New York
Filed July 31, 1968, Ser. No. 749,928
Int. Cl. G02f 1/28
U.S. Cl. 350—161         10 Claims

ABSTRACT OF THE DISCLOSURE

Acousto-optic devices dependent for their operation on alpha-iodic acid show improved efficiency as compared with devices based on earlier materials such as lithium niobate. Optical deflectors, modulators, switches and correlators are described.

BACKGROUND OF THE INVENTION

Field of the invention

The invention is concerned with devices involving deflection of electromagnetic radiation at visible and infrared frequencies responsive to an applied signal. While any of a variety of mechanisms may produce such deflection, the claimed devices are dependent upon an acousto-optic interaction. Such devices may be used as modulators, deflectors, correlators, switches, etc.

Description of the prior art

For some time it has been recognized that continuing development in various fields concerned with electromagnetic radiation will eventually result in a broad range of commercial devices operating at visible and near-visible wavelengths. Relevant fields include communications and optical display systems. Devices may operate as modulators, optical deflectors and correlators. While development effort has been stimulated by the development of the laser oscillator, certain of the devices may utilize incoherent and/or unpolarized radiation. Most require radiation which is substantially monochromatic although even here some may operate with relatively broad and/or varying bandwidth.

Relevant devices for altering some property of transmitted radiation depend upon a time variation or a space variation of refractive index responsive to an applied signal which may ultimately be produced by electrical excitation. The effect of the variation in refractive index is to produce a change in phase, frequency, amplitude, position or direction of a beam. Refractive index changes may be brought about through a variety of interactions, e.g., electro-optic, magneto-optic, and acousto-optic. While electro-optic and magneto-optic interactions now appear most promising for certain communication uses, the acousto-optic interaction is considered superior for many purposes. The range of application of acousto-optic devices has been expanding steadily and is currently under intense study, see vol. 54, Proceedings of the IEEE, p. 1391, October 1966.

Acousto-optic devices are, in essence, elastic wave-induced three dimensional diffraction gratings, producing an angular diffraction of a portion of an incoming electromagnetic wave. The angle of diffraction and the portion diffracted generally increase with the frequency and amplitude, respectively, of the interacting elastic wave. This mechanism naturally suggests position-sensitive devices such as beam deflectors used, for example, in information retrieval systems. Other uses may take advantage of ancillary effects as, for example, the variation in amplitude of the through-transmitted or diffracted beams due to variation in some property of the elastic wave. Depending on configuration dimensions, frequencies of the two types of wave energy, etc., such devices may be considered to operate over the range which has limits of Bragg or Raman-Nath diffraction as discussed later.

Recognizing the design advantages of acousto-optic devices for certain uses, there has been considerable experimentation using a large number of materials, and relevant characteristics have been reported, see, for example, Journal of Applied Physics, vol. 38, p. 5149 (1967). For many purposes, the most promising acousto-optic material reported to date has been lithium niobate. Power levels and bandwidth obtained with this material make it clear that more efficient materials are required.

SUMMARY OF THE INVENTION

Alpha-iodic acid ($\alpha$-HIO$_3$) is found to have a substantially higher acousto-optic figure of merit than any other optically transparent crystalline material yet investigated. This material is found to be more than an order of magnitude more efficient than lithium niobate. As such, alpha-iodic acid is usefully incorporated into the various types of devices which owe operation to the acousto-optic effect.

While description of the invention is in terms of iodic acid, it is to be understood that the essential properties are present also in the deuterated form, i.e., $\alpha$-DIO$_3$. Where use is made of the term "iodic acid," it is to be understood as encompassing the $\alpha$-deuterated as well as the ordinary $\alpha$-form and also mixed crystals of the two.

Consistent with usual interpretation, "acousto-optic" has reference to interactions between elastic waves and electro magnetic waves generally, regardless of frequency. There is, however, a definite material limitation imposed on the wavelength of the "optic" or electromagnetic energy by reason of transparency bandwidth which falls within the range of 0.3 to 2.3 microns in iodic acid. The term "optic," therefore, is intended to encompass wavelengths in the near ultraviolet, visible and infrared spectra however, for these purposes, within the approximate wavelength range of 0.3 to 2.3 microns. The term "acoustic" is intended to encompass any elastic wave. The term is not to be limited to wavelengths within the human audible range but is intended to include ranges variously referred to as sonic, supersonic, and ultrasonic, etc. In fact, the elastic wavelength range is determined by the desired range of operation of the particular device under consideration. This range is limited only by the general requirement that the elastic wavelength be equal to or greater than one half of the optical wavelength in the acousto-optic medium. This general requirement arises from a consideration of the minimum line spacing in the "grating" (equal to the acoustic wavelength) which is required to bring about the reinforcement necessary for diffraction.

The invention arises from the finding of the apparently unique suitability of iodic acid for use in a broad class of otherwise known acousto-optic devices. Since claims are broadly in terms of such devices, some descriptive matter is directed to their general design. Nevertheless, the invention is to be construed broadly and should be considered as encompassing all acousto-optic uses of iodic acid. Broadly, all such devices depend for their operation on the interaction of electromagnetic energy as defined and elastic wave energy as defined.

To distinguish the inventive devices from others using the same materials, it is specified that means be included for propagating elastic wave energy through the material. This means may constitute an elastic wave transmission line, a transducer (operating piezoelectrically, electrostrictively, or magnetostrictively) or, since iodic acid is itself piezoelectric, may simply consist of a pair of electrodes. Where provision is made for means for transmitting electromagnetic wave energy through the iodic acid, this terms too should be construed broadly. Such means may include an oscillator such as a laser or a thermally excited source (since diffraction devices do not require that the radiation be either coherent or polarized) or may simply consist of optically polished surfaces with or without coatings.

Historically, acousto-optic interactions have come to be considered as representative of one or the other of two limiting classes. The first of these is sometimes denoted Raman-Nath and sometimes Debye-Sears. The second class is called Bragg scattering.

These two limiting mechanisms are distinguished by the value of the fraction $$g = \frac{L \cdot \lambda_1}{\lambda^2_s} \quad (1)$$

where

L is the length of the waist of the elastic wave in the plane determined by the propagation directions of the elastic and optical waves. This waist may be either real or virtual. For example, the waist of an elastic wave emitted from a flat transducer occurs at the transducer and is equal to the transducer length; while for a curved transducer the elastic wave is to be focused to a waist at some distance away from the transducer.

$\lambda_1$ is the wavelength of electromagnetic radiation within the acousto-optic medium, and $\lambda_s$ is the wavelength of the elastic wave also within the acousto-optic medium.

Bragg diffraction occurs when the numerical value of $g$ in Eq. 1 is equal to or greater than one. In this limit, up to 100% of the incident electromagnetic radiation may be deflected to a single diffraction order, i.e., direction. The orientation of the elastic and electromagnetic waves in a Bragg device must be restricted to satisfy the Bragg conditions as shown in IEEE Journal of Quantum Electronics, vol. QE-3, p. 85, (1967). The Raman-Nath limit occurs when the value of $g$ in Eq. 1 is much less than one. In this case electromagnetic radiation is generally diffracted into many different orders. Although 100% of the incident electromagnetic energy may be deflected by a Raman-Nath device, the maximum energy directed into any given order is only 34%. The orientation of the elastic and electromagnetic waves in a Raman-Nath device is not critical to their performance as it is for a Bragg device.

While Bragg diffraction devices are generally preferred, if only by reason of their greater deflection efficiency to a single order, the invention should be considered to be of such scope as to encompass either mechanism or, indeed, any intermediate case where $g$ given by Eq. 1 is less than one but not small enough to be within the range applicable for the Raman-Nath limit.

BRIEF DESCRIPTION OF THE DRAWING

FIG. 1 is a diagrammatic view, partly in section of a Bragg deflector utilizing iodic acid as the operative element;

FIG. 2 is a perspective diagrammatic view of a deflection system using separate $x$ and $y$ Bragg deflectors;

Figure 3:
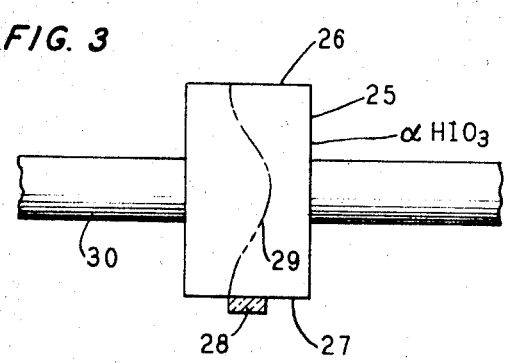
FIG. 3 is a diagrammatic view of a resonant acousto-optic device operating as a laser mode-locking structure.

DETAILED DESCRIPTION (1) *Drawing.*—The device in FIG. 1 is a Bragg deflector consisting of acousto-optic element 1 made of alpha-iodic acid and elastic wave source 2. Source 2 may be a piezoelectric transducer made, for example, of lithium niobate and, in this illustration, is shown equipped with electrodes 3 and 4 connected with AC or modulating source 5. In this illustration, body 1 is provided with optically polished surfaces 6 and 7. These surfaces may also be equipped with transparent coatings to protect them and/or to minimize reflection losses. In operation, a beam 8 of electromagnetic wave energy (which may be focused or defocused by a lens system not shown) of a wavelength within the transparency bandwidth of the iodic acid is introduced (after being refracted at the surface) at some angle theta to the advancing elastic wave fronts diagrammatically denoted 9. While some of beam 8 continues through body 1 and exits as beam 10 in a direction identical to that of beam 8, a discrete portion is deflected by interaction with the elastic wave into an angle two theta and emerges as beam 11.

The diagrammatic view of FIG. 1 illustrates the most efficient mode of operation of a Bragg deflector in accordance with which the incident and defracted beams are at the same angle, known as the Bragg angle, to the advancing elastic wave front. Bragg deflectors are, however, operative over a limited range of angles centered about this optimum orientation. The Bragg defraction condition requires constructive interference of scattered light waves. This condition is satisfied when the path distance traversed by a light wave defracted by one elastic wave front is one light wavelength greater than the path length of a light wave defracted from an adjacent wave front. For some operating conditions in which the sound wavelength is appreciably larger than the light wavelength, the diffraction angle two theta may be approximated as equal to the ratio of the light wavelength to the elastic wavelength. Since the elastic wavelength is, in turn, the ratio of the elastic velocity to the elastic frequency and since the velocity is constant within a given medium for a given direction of acoustic wave propagation, the diffraction angle to a first approximation is directly proportional to the elastic wave frequency. Variation in this frequency, therefore, permits selection of any of a variety of deflection angles. Advantage is taken of this relationship in a multiposition $x, y$ deflector system, such as that shown in FIG. 2.

The device shown in FIG. 1 may also be operated as a general information processing device which uses an optical link. For example, when the frequency of the source 5 is made to follow the (swept) frequency of a chirped radar signal the device can be made to provide pulse compression for the received signal, thereby improving its signal to noise ratio. Similarly, by placing other information onto the elastic wave by suitably varying the frequency and/or amplitude of source 5, the device can be made to perform the information processing functions of correlation, filtering, spectrum analysis, etc.

The devices of the invention are in essence changeable phase diffraction gratings, and the diffraction efficiency is related to the variation in refractive index produced by the elastic wave. Since this variation is, in turn, dependent upon the amplitude of the elastic wave, the magnitude of the diffracted beam energy is so determined. The figure of merit for such a grating may be determined from:

$$M_2 = \frac{n^6 p^2}{\rho v^3} \quad (2)$$

where $M_2$ is the figure of merit for a specified combination of elastic and electromagnetic wave directions and polarizations relative to the crystal structure of the acousto-optic medium, $n$ is the reflective index, $p$ is the photoelastic component, $\rho$ is the density of the acousto-optic medium, and $v$ is the elastic wave velocity in the acousto-optic medium.

The values of $n$, $p$ and $v$ depend on the crystallographic orinetation. For example, twelve independent photoelastic components are permitted by the symmetry of alpha-iodic acid crystal. Useful values of the figure of merit have been found for longitudinal and shear elastic waves in combination with optical waves polarized along each of the three major crystallographic directions. Many of the corresponding figures of merit have now been determined for different optical wavelengths, and the best of these values have been found to be approximately twelve times superior to the best value for lithium niobate. The electrical power necessary to deflect 70% of the incident light beam for a typical configuration having a longitudinal elastic wave travelling in the crystallographic $c$ direction and an electromagnetic beam travelling in the $a$ direction and polarized in the $b$ direction was experimentally found to be about 265 mw. at an elastic wave midband frequency of 90 mHz. The 3 db bandwidth was 55 mHz. and the optical wavelength was 6328 A. Due largely to the wavelength dependence of the figure of merit, only 94 mw. of electrical power was required to reflect 70% of 4880 A. radiation.

The deflector system of FIG. 2 consists of alpha-iodic acid element 15 provided with elastic wave generator 16, alpha-iodic acid element 17 equipped with elastic generator element 18, focusing lens 19 and display screen and/or information storage plane 20. In operation, electromagnetic radiation of appropriate wavelength is introduced as beam 21 from a source not shown. On passing through element 15, a portion of this beam is deflected vertically to any position between the two limiting beam directions 22 and 23 by an amount determined by the elastic wave produced by generator 16 energized by means not shown. The vertically deflected beam is similarly deflected in the $x$ or horizontal, direction upon passing through element 17 by reason of interaction with elastic wave fronts produced by generator 18 and again energized by means not shown. The result is that the light beam which is now both vertically and horizontally deflected emerges from element 17 in any of the limiting positions shown as beams 24, 25, 26 and 27 or in any intermediate direction dependent upon the frequencies at which generators 16 and 18 are energized. The deflected beam, upon passage through focusing lens 19, is resolved to a spot on the focal plane element 20. The system may be used for display purposes by sequentially deflecting a varying fraction of the incident light beam 21 to each resolvable spot position on the display screen element 20. When the system is used in information processing, each resolvable position on the display screen will be a site of information storage. The information may be stored photographically, holographically, or by some other convenient means. When it is desired to detect or "read-out" information stored at any particular position on element 20, generators 16 and 18 are energized at the appropriate frequencies to deflect the light to that position. The stored information is then projected onto an array of light sensitive detectors not shown.

FIG. 3 depicts an acousto-optic element arrangement for mode-locking a laser. The alpha-iodic element 25 in this instance is equipped with reflecting ends 26 and 27. The elastic wave transducer 28 energized at the appropriate frequency by means not shown results in a standing elastic wave 29. Broken section 30 represents a portion of a laser cavity. Mode locking results when the acousto-optic element 25 is so designed and operated as to produce a periodic diffraction of the same periodicity (or multiples thereof) as the resonant frequency which separates longitudinal or transverse modes of the laser. In general, mode locking by the arrangement shown is accomplished by operation in the Raman-Nath limit and to this end, transducer 28 is depicted as having a relatively short dimension in the direction of optical propagation. Alternatively, designs may be such as to utilize Bragg diffraction in which event the arrangement is desirably such that the light transmission direction is at the usual Bragg angle, theta, to the elastic wave front.

Figure 4:
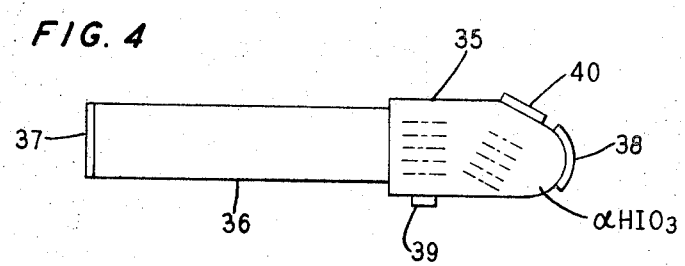
FIG. 4 is a diagrammatic view of a laser cavity containing an acousto-optic element serving the dual functions of mode-locking and sampling.

The arrangement shown in FIG. 4 consists of a body 35 of alpha-iodic acid and a laser 36 such as YAG-neodymium. The laser cavity is defined by reflecting layers 37 and 38. Body 35 is provided with a Raman-Nath elastic wave transducer 39 for mode locking and also with a Bragg elastic wave transducer 40 for deflecting and thereby sampling laser emanations.

Figure 5:
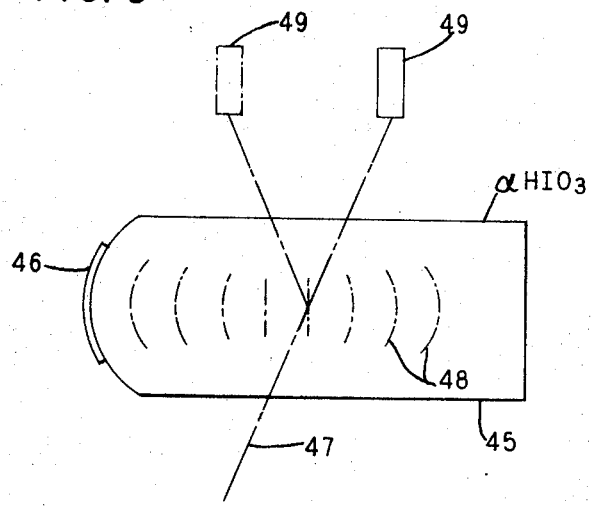
FIG. 5 is a diagrammatic view of a focused elastic wave beam, acousto-optic deflector.

The device of FIG. 5 is a focused elastic wave Bragg deflector usefully operated as a modulator. It consists of alpha-iodic acid body 45, curved elastic wave transducer 46, and means for transmitting a light beam such as 47. The curved transducer focuses elastic waves to a waist at the approximate center of body 45 as diagrammatically depicted by the elastic wave fronts 48. Beam 47 is deflected at a discrete angle in accordance with the usual Bragg mechanism. Amplitude modulation is accomplished by placing a detector 49, as shown, so as to measure the intensity of the portion of beam 47 which is undiffracted. It has been seen that the intensity as measured by 49 is dependent on both elastic wave amplitude and elastic wave frequency. Alternatively, detector 49 may be placed in the phantom position indicated so as to measure the intensity of the portion of beam 47 which is diffracted.

The purpose of a focused elastic wave device is to decrease the required amount of elastic wave energy. It has been demonstrated that the modulation bandwidth is proportional to the angular range of the elastic wave beam and further that optimum modulation is achieved for an elastic wave angle range equal to the diffraction angle of the light. Suitable modulator design involves a trade-off of one consideration for the other. It has also been shown by E. I. Gordon, vol. 54, Proceedings of the IEEE, p. 1391 (October 1966) that the advantage of focusing is retained even where the interaction takes place in a volume not including the focal plane, i.e. waist, and even for the extreme case where the focal plane, real or virtual, is not in the acousto-optic medium. The advantage of bringing about the interaction close to the elastic wave transducer rather than at the focal plane is the minimization of delay time corresponding to the transit time for elastic wave fronts to reach the light beam position from the elastic wave transducer.

The device depicted in FIG. 5 may also, with suitable modulation of the input ultrasonic wave, be made to perform some of the general information processing functions, such as correlation and chirped radar pulse compression, described previously in the discussion of FIG. 1.

The depicted devices include transducers for generating elastic waves; and for various engineering reasons, it is expected that this is the most likely form that such devices will take. However, since alpha-iodic acid is itself piezoelectric, the material may be made to operate as its own transducer. Such a device would substitute electrodes for the separate transducer element.

(2) *Material considerations.*—Alpha-iodic acid is colorless and transmits light without measurable absorption and without optical damage over the transparency wavelength range of from about 0.4 to about 1.3 microns. Some light is transmitted with absorption but without damage in the ranges of 0.3 to 0.4 and 1.3 to 2.3 microns. The elastic wave attenuation is low and has a typical value of 2.5 db./cm. for longitudinal waves at 500 mHz. The longitudinal acoustical impedance is similar to that of fused silica; and the material is, therefore, compatible with transducer materials such as lithium niobate. The material is sufficiently hard to take the requisite machining and polishing. Unprotected surfaces, however, deteriorate slowly with time and must, therefore be protected for long term use. Optical surfaces may be protected by coatings such as magnesium fluoride or by glass covers attached with transparent cement. Nonoptical and/or electrode surfaces may be protected by vapor deposited chrome-gold films. The material is easily grown from water solution, see for example (Ref. Bergman Paper) vol. 12 Applied Physics Letters, p. 186 (March 1968), The Art and Science of Growing Crystals, J. J. Gilman, Ch. 11, p. 194, John Wiley & Sons 1963.

The suitability of alpha-iodic acid is due to the various factors in the figure of merit (see Eq. 2). Additions, either accidental or intentional, are tolerable in that they do not significantly adversely affect any of these criteria. Purposes for intentional inclusions might be, for example, to selectively absorb unwanted optical radiation present in some applications, or even to provide the active medium for achieving laser action. Intentional inclusions of, for example, chromium, neodymium and iron up to a total content of the order of 1% by weight would have little effect on acousto-optic device operation otherwise.

Devices are most desirably fabricated from single crystal material; and, accordingly, this form is to be preferred. However, since there is a photoelastic component in all directions for all polarizations, some resolved effect is obtained in a polycrystalline body. Advantage may be taken of this in less sophisticated devices. The various techniques including sputtering and vapor deposition, designed to produce preferred crystal orientation, may be adapted to the preparation of layered polycrystalline devices retaining some of the efficiency of single crystals.

The invention has been described in terms of a limited number of embodiments. It has been indicated, however, that the described properties of $\alpha$-HIO$_3$ (including $\alpha$-DIO$_3$) suggest the use of this material in any device operating on an acousto-optical principle.

What is claimed is:

1. Acousto-optic device comprising at least one acousto-optic element provided with first means for generating elastic waves and second means for transmitting electromagnetic radiation, the said first and second means being such as to result in diffraction of at least a portion of said electromagnetic radiation characterized in that the said element is a crystalline body consisting essentially of a composition selected from $\alpha$-HIO$_3$, $\alpha$-DIO$_3$ and mixtures thereof.

2. Device of claim 1 in which said electromagnetic radiation is essentially monochromatic and of a wavelength in vacuum within the approximate range of from 3,000 A. to 23,000 A.

3. Device of claim 2 in which said electromagnetic radiation is substantially coherent.

4. Device of claim 2 in which said first means is capable of generating elastic waves of different wavelengths.

5. Device as defined in any one of claims 1, 2, 3 or 4 in which the operational conditions are such that the waist of the generated elastic wave front multiplied by the wavelength of electromagnetic radiation divided by the wavelength of the elastic wave squared is numerically at least equal to one; wherein said waist is the minimum value of the straight line dimension of the said elastic wave in a direction parallel to the propagation direction of the said electromagnetic radiation in the plane defined by the said elastic wave and the said electromagnetic radiation.

6. Device of claim 1 in which the said first means is of such design as to produce focused elastic waves.

7. Device of claim 1 in which the said second means includes a laser cavity and in which the deflected portion of the beam is thereby removed from the said cavity.

8. Device as defined in any one of claims 1, 2, 3 or 4 in which the operational conditions are such that the waist of the generated elastic wave front multiplied by the wavelength of electromagnetic radiation divided by the wavelength of the elastic wave squared is numerically less than one; wherein said waist is the minimum value of the straight line dimension of the said elastic wave in a direction parallel to the propagation direction of the said electromagnetic radiation on the plane defined by the said elastic wave and the said electromagnetic radiation.

9. Device of claim 1 in which the said element is so arranged as to constitute a resonant cavity for said elastic waves.

10. Device of claim 9 in which said second means comprises a laser cavity and in which the said first means is of such nature as to generate elastic waves of a frequency equal to a multiple of the resonant mode frequency spacing of the said laser cavity.

No references cited.

RONALD L. WIBERT, Primary Examiner

P. K. GODWIN, JR., Assistant Examiner

U.S. Cl. X.R.

331—94.5; 332—7.51